US009049545B2

(12) United States Patent
Duggal et al.

(10) Patent No.: US 9,049,545 B2
(45) Date of Patent: Jun. 2, 2015

(54) SYSTEM AND METHOD FOR DETERMINING LOCATION OF AN ITEM

(75) Inventors: Jagjit Duggal, Panchkula (IN); Manish Agarwal, Allahabad (IN)

(73) Assignee: Infosys Limited, Bangalore (IN)

( * ) Notice: Subject to any disclaimer, the term of this patent is extended or adjusted under 35 U.S.C. 154(b) by 302 days.

(21) Appl. No.: 13/328,857

(22) Filed: Dec. 16, 2011

(65) Prior Publication Data

US 2013/0069782 A1    Mar. 21, 2013

(30) Foreign Application Priority Data

Sep. 20, 2011    (IN) .......................... 3244/CHE/2011

(51) Int. Cl.

| | |
|---|---|
| H04M 3/42 | (2006.01) |
| H04W 4/02 | (2009.01) |
| G06K 19/07 | (2006.01) |
| G08B 13/24 | (2006.01) |
| H04W 64/00 | (2009.01) |
| H04W 4/00 | (2009.01) |
| H04W 4/12 | (2009.01) |

(52) U.S. Cl.
CPC ............. H04W 4/02 (2013.01); *G06K 19/0723* (2013.01); H04M 3/42357 (2013.01); *G08B 13/2417* (2013.01); *H04W 64/00* (2013.01); *H04M 3/42348* (2013.01); *G08B 13/2462* (2013.01); *H04W 4/008* (2013.01); *H04W 4/12* (2013.01)

(58) Field of Classification Search
CPC .......... G06K 19/0723; G06K 17/0045; G06K 2017/0045; H01Q 1/2216; H01Q 1/2225; H04B 5/0062; H04W 4/02; H04W 64/00; H04W 4/008; G01S 5/0018; G01S 5/0027; G08B 13/2417
USPC ................. 340/539.13, 539.32, 568.1, 572.1; 455/456, 404.2, 414.2, 414.3
See application file for complete search history.

(56) References Cited

U.S. PATENT DOCUMENTS

| | | | |
|---|---|---|---|
| 8,319,646 B2 * | 11/2012 | Evans et al. ................. | 340/572.7 |
| 2004/0145474 A1 * | 7/2004 | Schmidtberg et al. ...... | 340/572.1 |
| 2009/0036104 A1 * | 2/2009 | Malik ......................... | 455/414.1 |
| 2012/0052879 A1 * | 3/2012 | Wildon et al. .............. | 455/456.1 |

* cited by examiner

*Primary Examiner* — Daniell L Negron
*Assistant Examiner* — Benyam Haile
(74) *Attorney, Agent, or Firm* — Klarquist Sparkman, LLP

(57) ABSTRACT

The present disclosure provides a system and method for determining a location of an item using the services of an existing cellular infrastructure. A search request comprising a first item identifier of the item is received by a tracking service server from a user. A second item identifier of the item is retrieved by the tracking service server from a tracking service database. A search signal comprising the second item identifier is transmitted from the tracking service server to at least one mobile service provider system. The search signal is transmitted by the at least one mobile service provider system to a plurality of communicatively coupled transmitting towers which are configured to locate the item by capturing radio frequency signals, comprising the second item identifier, emitted by an identification tag coupled to the item.

24 Claims, 5 Drawing Sheets

| Item Names 200 | User Details 202 | | First Item Identifiers 208 | Second Item Identifiers 210 |
|---|---|---|---|---|
| | User Name 204 | Contact Information 206 | | |
| Item_Name_1 200a | User_Name_1 204a | Cell_Number 206a | First_Id_1 208a | Second_Id_1 210a |
| Item_Name_2 | User_Name_2 | Email_Id | First_Id_2 | Second_Id_2 |
| Item_Name_3 | User_Name_3 | Pager_Number | First_Id_3 | Second_Id_3 |
| Item_Name_4 | User_Name_4 | Physical Address | First_Id_4 | Second_Id_4 |

FIG. 2

SYSTEM AND METHOD FOR DETERMINING LOCATION OF AN ITEM

CROSS REFERENCE TO RELATED APPLICATIONS

This application claims the benefit of India Patent Application No. 3244/CHE/2011, filed in India on Sep. 20, 2011, which is incorporated by reference herein.

FIELD

The present disclosure relates generally to a system and a method for determining a location of an item. More particularly, the disclosure relates to a system and method for tracking a stolen, lost or missing item using a cellular network infrastructure and location algorithms that estimate the strength of a radio frequency signal emitted from an identification tag coupled with the item.

BACKGROUND

Systems for tracking and locating valuable items have been an area of interest to the industry for minimizing financial loss caused to their customers and to public at large. Such systems may include navigational aids and tracking devices. An alternate technique used for tracking items has been through the use of Global Positioning System (GPS) information. The GPS system requires GPS receivers to be mounted on the item for receiving GPS signals from the overhead satellites. The installation of a GPS receiver on each item to be tracked tends to increase the overhead cost of operation. Installation of a GPS receiver also increases the overall size of the item. Further, installation of a GPS receiver would lead to a continuous monitoring of the location of the item, which could be undesirable for a user of the item. The user might need an item to be tracked only in certain situations such as a theft or loss of the item. During normal operations the user might not desire the tracking service. Hence there is a need for a system that can track items when required by the user of the item in a cost-effective manner.

Techniques known in the art have employed the use of a Radio Frequency Identification (RFID) tag coupled with an item to be tracked and an RFID reader capable of communicating with the RFID tag. However a major limitation of the RFID reader is the need for close proximity with the item to be tracked. As a result, multiple installations of RFID readers are required for effectively tracking the item, which may result in additional infrastructure cost. Further as cost of an RFID reader is high, the overall cost of installation of the system employing RFID readers for tracking the item increases.

Hence there is a need for a system that can track the item on a request of the user rather than tracking the item continuously. Further there is a need for a cost-effective solution that utilizes existing infrastructure and minimizes the use of additional hardware. The present disclosure proposes a cost-effective solution where the existing cellular network infrastructure is used for tracking items.

SUMMARY

The present disclosure discloses a method and system for determining a location of an item using existing cellular infrastructure. In accordance with a disclosed embodiment, the system comprises a tracking service server configured to receive a search request comprising a first item identifier of the item from a user, retrieve a second item identifier of the item from a tracking service database and transmit a search signal comprising the second item identifier of the item to at least one mobile service provider system. The system further comprises at least one mobile service provider system communicatively coupled with the tracking service server, and a plurality of transmitting towers communicatively coupled with the at least one mobile service provider system configured to receive the search signal from the at least one mobile service provider system, capture radio frequency signals emitted by an identification tag coupled with the item when the search signal is received and transmit a location message comprising location information of the item to the at least one mobile service provider system on capturing the radio frequency signals.

In an additional embodiment, a method for receiving a search request comprising a first item identifier of an item from a user by a tracking service server is disclosed. The disclosed embodiment, may include retrieving a second item identifier of the item from a tracking service database, transmitting a search signal comprising the second item identifier to at least one mobile service provider system, transmitting the search signal to a plurality of transmitting towers in communication with the mobile service provider system, capturing radio frequency signals emitted by an identification tag coupled to the item from a transmitting tower in the plurality of transmitting towers where the radio frequency signals include the second item identifier of the item and transmitting a location message comprising location information of the item from the transmitting tower to the at least one mobile service provider system when the second item identifier emitted by the identification tag is received by the transmitting tower.

These and other features, aspects, and advantages will be better understood with reference to the following description and claims.

BRIEF DESCRIPTION OF THE DRAWINGS

FIG. 2 is a tabular diagram illustrating a tracking service database, in accordance with an embodiment.

While systems and methods are described herein by way of example and embodiments, those skilled in the art recognize that systems and methods for tracking a location of an item are not limited to the embodiments or drawings described. It should be understood that the drawings and description are not intended to be limiting to the particular form disclosed. Rather, the intention is to cover all modifications, equivalents and alternatives falling within the spirit and scope of the appended claims. Any headings used herein are for organizational purposes only and are not meant to limit the scope of the description or the claims. As used herein, the word "may" is used in a permissive sense (i.e., meaning having the potential to) rather than the mandatory sense (i.e., meaning must).

Similarly, the words "include", "including", and "includes" mean including, but not limited to.

DETAILED DESCRIPTION

Figure 1:
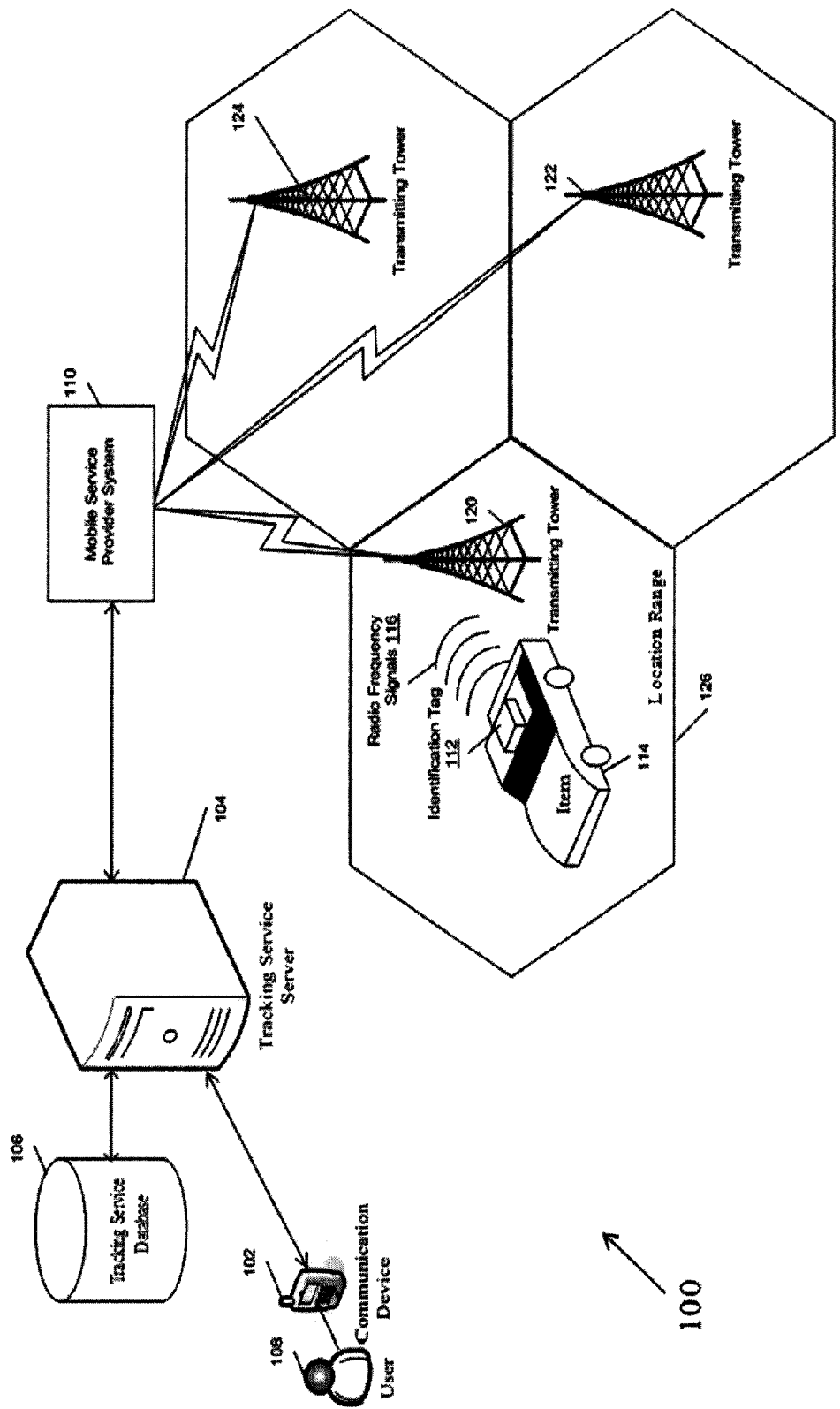
FIG. 1 is a schematic illustration, in accordance with an embodiment, of an environment for determining a location of an item by a tracking service server coupled to at least one mobile service provider, which in turn is coupled to a plurality of transmitting towers.

FIG. 1 illustrates an environment 100 for determining the location of an item 114. Various embodiments of the invention can be practiced within the depicted environment 100. The environment 100 includes a user 108, a communication device 102, a tracking service database 106 operatively coupled to a tracking service server 104 configured to track the item 114 belonging to the user 108 existing within a cellular network architecture. The cellular network architecture is shown to comprise, but is not limited to, a mobile service provider system 110 communicatively coupled to a plurality of transmitting towers 120, 122 and 124. The item 114 is coupled to an identification tag 112 such as an active Radio Frequency Identification (RFID) Chip, capable of emitting low frequency radio frequency signals 116. Cellular antennas mounted on the plurality of transmitting towers 120, 122 and 124 are configured to read the radio frequency signals 116 emitted by the identification tag 112 so that the presence of the item 114 within a location range 126 of a transmitting tower 120 can be detected.

In an embodiment, the user 108 sends a search request for tracking the item 114 from the communication device 102 to the tracking service server 104. The tracking service server 104 is preferably configured to log the search request received by the user 108 and process a search for the item 114. The tracking service server 104 can be hosted by a tracking service center that offers among other services, a service of tracking missing, lost or stolen items. The search request sent by the user 108 includes a first item identifier 208a of FIG. 2 of the item 114. In the disclosed embodiment, the first item identifier 208a is a unique code that verifies the identity of the item; such as a License Plate Number (LPN) of an automobile, where the item 114 is the automobile in an instance. The tracking service server 104 can be coupled to a tracking service database 106 for retrieving a second item identifier 210a of FIG. 2 of the item 114 from the tracking service database 106. In accordance with the disclosed embodiment, the tracking service database 106 in FIG. 2, can store a list of item names 200 of a list of items registered with the tracking service center, a list of user details 202 of the users to whom the list of items belong, a list of first item identifiers 208 and a list of second item identifiers 210 of the list of items. The list of user details 202 can include a user name 204 and a contact information 206. A second item identifier 210a of FIG. 2 can include a unique Electronic Product Code (EPC) of the item 114 that uniquely identifies the item 114. The unique EPC of the item 114 can be provided by the tracking service center while registering the item 114 in the tracking service database 106. The tracking service center can provide the unique EPC to the item 114 by embedding the identification tag 112 that includes the unique EPC into the item 114. The identification tag 112 including the unique EPC can be operated to emit the unique EPC by radio frequency signals 116. On retrieving the second item identifier 210a, a search signal including the second item identifier 210a of the item 114 is transmitted by the tracking service server 104 to a mobile service provider system 110. The search signal can be transmitted from the tracking service server to the mobile service provider system through a secured connection. In the disclosed embodiment, the search signal can be sent through SMS communication. The tracking service center can have a license with more than one mobile provider system 110 for the purpose of providing the service of tracking items; and hence the tracking service server 104 may transmit the search signal to all such mobile provider systems with whom the tracking service center has licensed with.

Further the mobile service provider system 110 transmits the search signal to a plurality of transmitting towers such as 120, 122, and 124 as shown in FIG. 1 where the plurality of transmitting towers are owned or licensed by the mobile service provider system 110. The search signal may be transmitted from the mobile service provider system 110 to the plurality of transmitting towers 120, 122, and 124 by any of the communication techniques as known in the art. On receiving the search signal the plurality of transmitting towers 120, 122, 124 can be programmed to capture the radio frequency signals 116 that may be emitted by the identification tag 112 coupled to the item 114. However, the cellular antennas of the transmitting tower 120 can capture the radio frequency signals 116 only when the item 114 preferably exists within a location range 126 of the transmitting tower 120. The location range 126 is preferably a cell site or a cell range within which the cellular antennas of the transmitting tower 120 exhibit a radiation pattern and are capable of capturing the radio frequency signals emitted by the identification tag 112. On capturing the radio frequency signals 116 from the identification tag 112 of the item 114 by the transmitting tower 120, a location message is transmitted by the transmitting tower 120 to the mobile service provider system 110. The location message typically includes location information of the item 114.

In the disclosed embodiment, the location information can be a function of a set of location coordinates of the transmitting tower 120. A technique of triangulation, as known in the art, may be followed for narrowing down the location information of the item 114 within the location range 126 to a much smaller area. The narrowed location information is preferably of higher relevance for the purpose of tracking the item 114. The location message can include the second item identifier 210a of the item 114. The location information and the second item identifier 210a are retrieved from the received location message by the mobile service provider system 110 and further transmitted to the tracking service server 104. The tracking service server 104 can be configured to receive the location information and the second item identifier 210a from the mobile service provider system 110. The first item identifier 208a can be retrieved from the tracking service database 106, by mapping the received second item identifier 210a to the first item identifier 208a, where the first item identifier 208a is stored against the second item identifier 210a within a single entry of the tracking service database 106, the single entry being that of the item 114 being searched for. On retrieving the first item identifier 208a of the item 114, from the tracking service database 106, a response message including the location information and the first item identifier 208a, is communicated by the tracking service server 104 to the user 108. In the disclosed embodiment, where the item 114 is an electronic device such as a mobile phone, the user 108 on receiving the response message can send a lock request to the tracking service server 104 for deactivating the item 114. The user 108 can send the lock request to the tracking server 104 prior to receiving the response message from the tracking service server 104.

On receiving the lock request, the tracking service server 104 can transmit a lock signal to the mobile service provider system 110, which in turn can transmit the lock signal to the transmitting tower 120 that detected the location of the item 114. The transmitting tower 120 can transmit a deactivation signal that is programmed to deactivate the item 114. In the disclosed embodiment, where the item is an electromechanical device such as an automobile, the user 108 can send the lock request to the tracking service server for immobilizing the item 114. On receiving the lock request, the tracking service server 104 can transmit a lock signal to the mobile service provider system 110, which in turn can transmit the lock signal to the transmitting tower 120, which detected the location of the item 114. In the disclosed embodiment, where the item 114 is an automobile, the lock signal can be programmed to lock the ignition of the automobile remotely as soon as the lock request is received from the user 108. On receiving the lock signal by the transmitting tower 120, the transmitting tower can transmit an immobilizing signal that is programmed to block the movement of the item 114.

In the disclosed embodiment, the communication device 102, may be any suitable electronic device including but not limited to a cell phone, a personal digital assistant (PDA), a handheld computer, a Bluetooth headset, and the like capable of communication with the tracking service server 104. In the disclosed embodiment, the user 108 can utilize a communication method for logging the search request with the tracking service server 104, the communication method including communicating the search request by mail to a personnel appointed by the tracking service center, to attend the search request that are directed to the tracking service server 104. In the disclosed embodiment, the tracking service server can host a web portal to which search request for locating the item 114 can be sent by using a web browser as a communication interface on the communication device 102. The communication interface can be a SMS application that communicates the first item identifier via a short messaging service (SMS) message directed to the mobile service provider system 110 to a mobile communication network. The mobile communication network can direct the SMS comprising the first item identifier to the mobile service provider system 110. The user 108 can connect to a call center and report the search request to a customer care representative of the call center where the communication device 102 is a PSTN telephone. The customer care representative can in turn log the search request into the web portal hosted by the tracking service server through a web browser. In an embodiment where the communication device 102 is the PSTN telephone the user 108 can input the first item identifier into an Interactive Voice Recognition (IVR) system. A WAP micro-browser may be used as the communication interface to communicate the search request to a WAP gateway, and the WAP gateway can in turn communicate the search request to the tracking service server, where the communication device 102 is a WAP enabled mobile phone.

Alternatively, the tracking service server 104 can be hosted by an Insurance company who undertakes the responsibility of tracking items that are insured. In case of a theft of the item 114 insured by the Insurance Company, the tracking service server 104 can aid in tracking the item 114 and thereby save the Insurance Company from paying a huge sum of money towards the theft or loss of insured items. The Insurance Company can assign the unique EPC to the item 114 at the time of insurance of the item 114. The Insurance Company can assign the unique EPC to the item 114 by embedding the identification tag 112, which includes the unique EPC, into the insured item 114. The Insurance Company can further store the name and contact information of the user 108, the first item identifier and the second item identifier of the item along with insurance policy details such as policy number, time period, and date of issuance in a database such as the tracking service database 106 where the tracking service database shall be owned by the Insurance Company and shall be in communication with the tracking service server 104 that is hosted by the Insurance Company in the embodiment.

Figure 3:
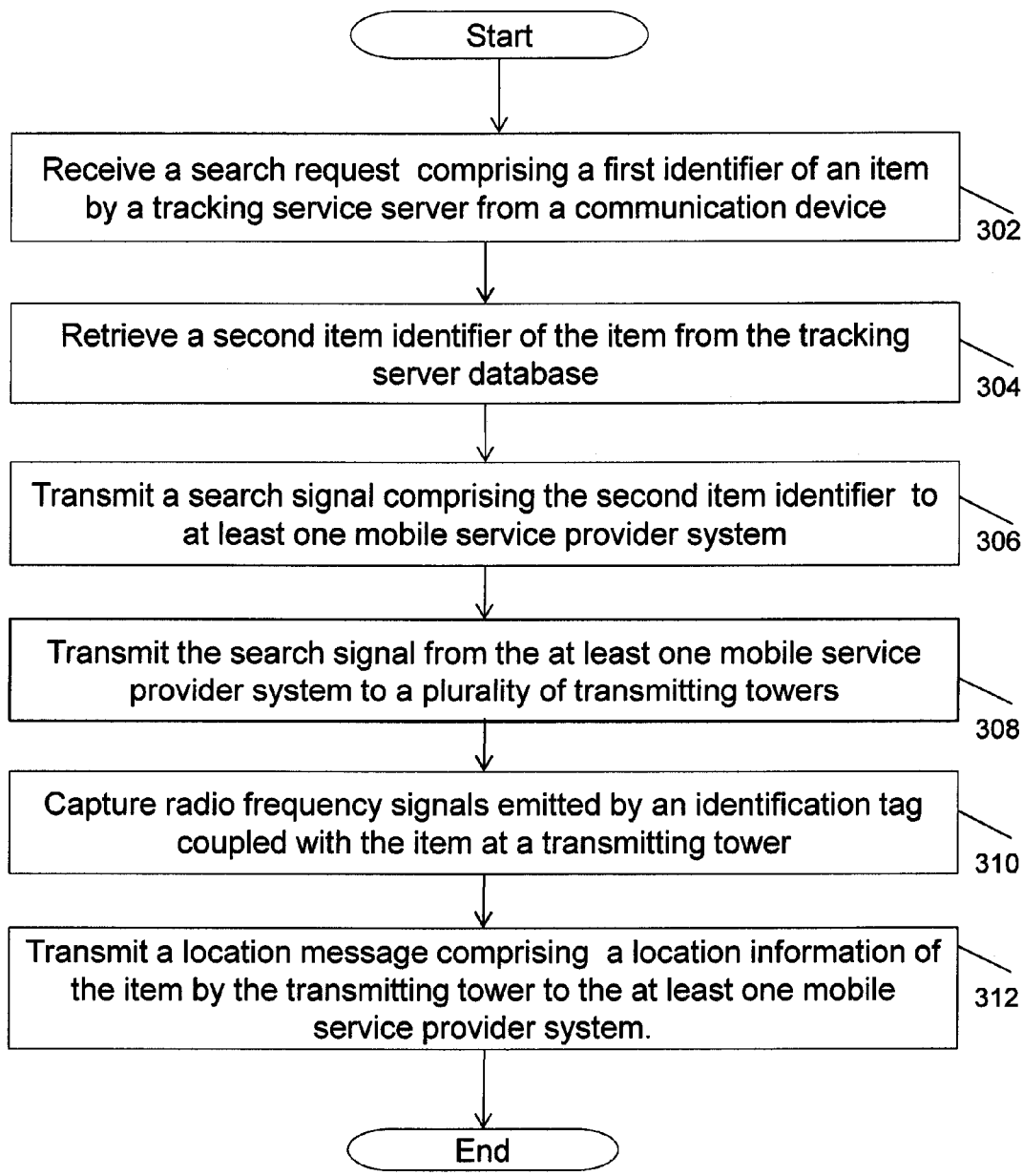
FIG. 3 is a flowchart illustrating an embodiment of a method of determining the location of the item by the tracking server in communication with the at least one mobile service provider.

FIG. 3 describes the basic steps of a method for determining the location of an item in accordance with an embodiment of the invention. At step 302 a search request for locating the item is transmitted from a communication device of a user to a tracking service server. The search request includes a first item identifier of the item. In the disclosed embodiment, the first item identifier can be any unique product code such as the license plate number of an automobile where the item is the automobile. A second item identifier of the item is retrieved by the tracking service server from a tracking service database at step 304. The second item identifier is mapped to the received first item identifier, where the received first item identifier and the second item identifier are stored across an item name of the item within a single entry in the tracking service database. In the disclosed embodiment, the second item identifier can be a unique Electronic Product Code (EPC) assigned to the item by the tracking service server. The tracking service server can assign the unique EPC to the item by embedding an identification tag that includes the unique EPC into the item. The identification tag including the unique EPC can be operated to emit the unique EPC by radio frequency signals. At step 306, the search signal comprising the second item identifier is transmitted by the tracking service server to a mobile service provider system. The mobile service provider system can be chosen from one or more mobile service provider systems with whom the tracking service server 104 has preferably contracted for tracking the loss, theft and the like incidents on items.

The search signal can be transmitted to one or more of the one or more mobile service provider systems with whom the tracking service server has contracted. At step 308, the search signal is transmitted by the mobile service provider system to a plurality of transmitting towers that are a part of a cellular architecture of the mobile service provider system. At step 310, on receiving the search signal from the mobile provider system the radio frequency signals emitted by the identification tag present within the item are captured by a cellular antenna of a transmitting tower in the plurality of transmitting towers, when the item is present within a location range of the transmitting tower. The radio frequency signals can typically include the second item identifier of the item. The radio frequency signals can include a unique EPC of the item that is preferably embedded in the identification tag of the item by the tracking service center hosting the tracking service server. On capturing the radio frequency signals including the second item identifier, the captured second item identifier is mapped to the received second item identifier of the search signal thereby signifying the presence of the item within the location range of the transmitting tower. At step 312, the location message comprising the location information of the item is transmitted by the transmitting tower to the mobile service provider system. The location information can include a function of a set of location coordinates in the geo spatial domain of the transmitting tower. A technique of triangulation, as known in the art, may be followed for narrowing down the location information of the item within the location range to a much smaller area. The narrowed location information is preferably of higher relevance for the purpose of tracking the item.

Figure 4A:
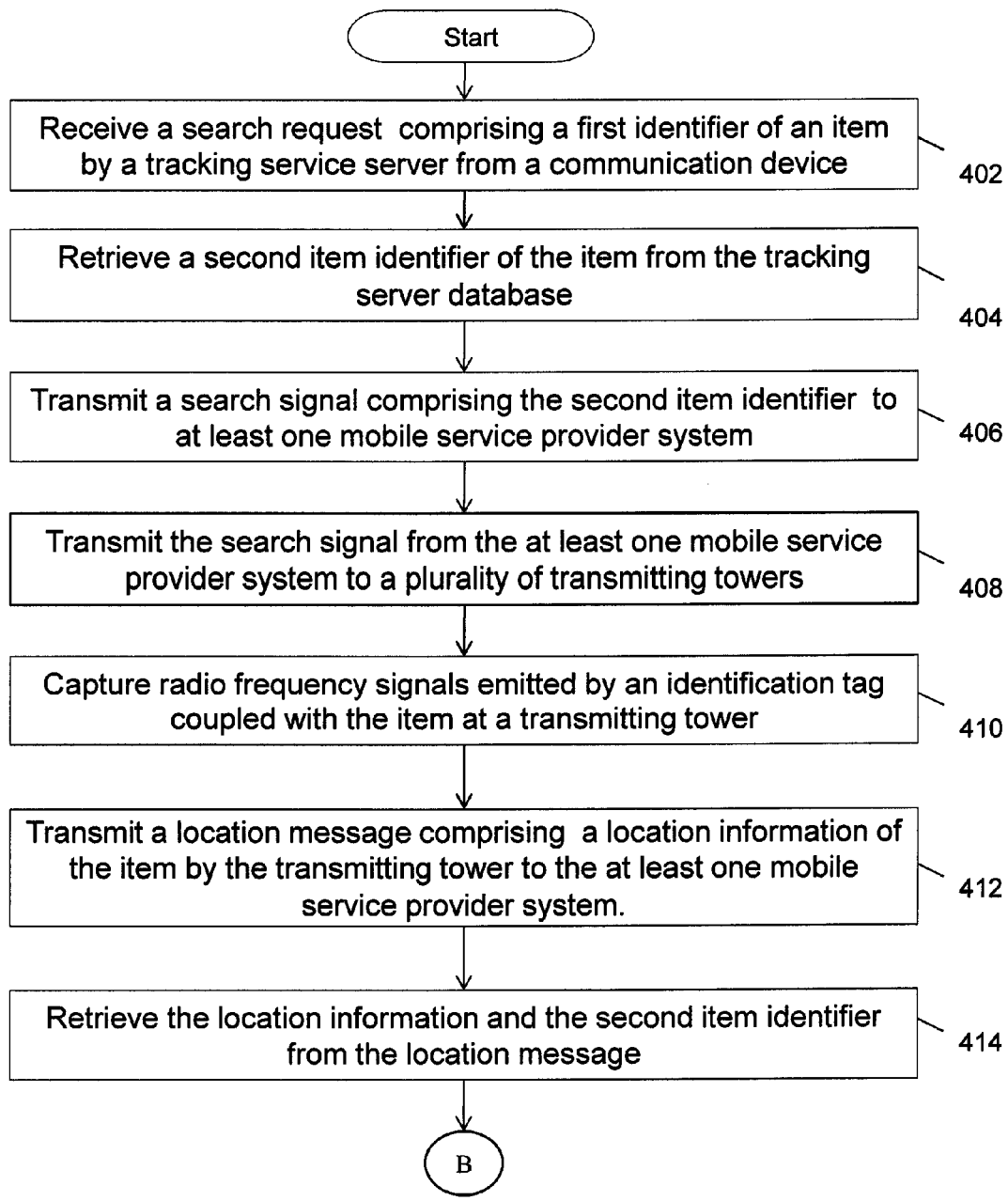
FIGS. 4a and 4b depict a flowchart illustrating an embodiment of a method of determining the location of the item by the tracking server in communication with the at least one mobile service provider.
Figure 4B:
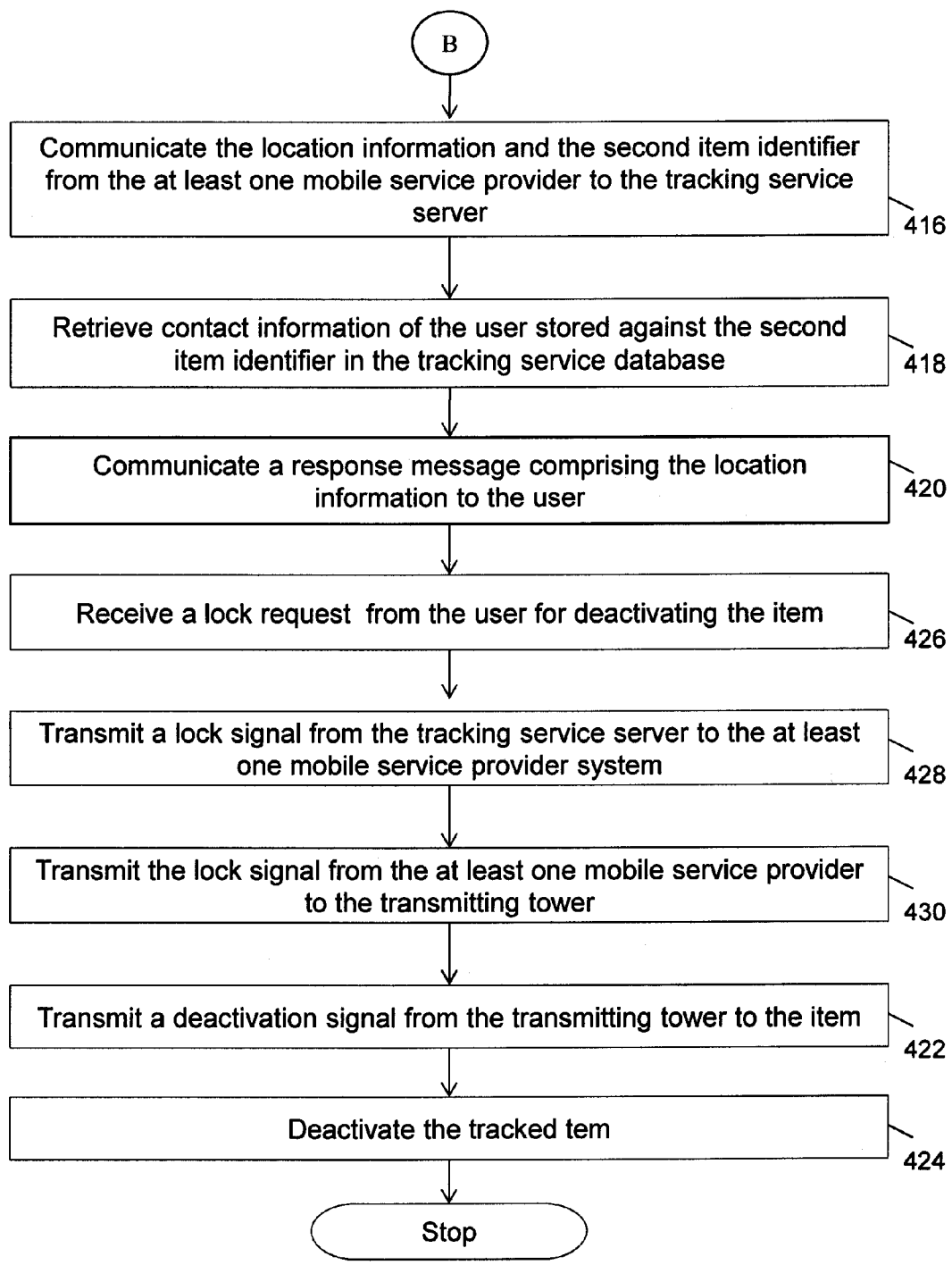

FIG. 4a and FIG. 4b describe an alternate embodiment of a method of practicing the instant invention. In step 402, the search request for tracking the item is transmitted from a communication device to a tracking service server. The search request essentially comprises a first item identifier of the item; indicating to the tracking server the identity of the item to be tracked. At step 404, the tracking service server searches for a second item identifier of the item in a tracking service database, where the second item identifier of the item is stored against the first item identifier within a single entry of the item. On retrieving the second item identifier the tracking service server processes a search signal comprising the second item identifier and transmits the search signal to a mobile service provider system. The search signal can be transmitted to one or more mobile service provider systems, with whom the tracking service center has contracted, for the purpose of providing the service of tracking items. The mobile service provider system further transmits the search signal to a plurality of transmitting towers that are part of a cellular architecture of the mobile service provider system. The one or more mobile service provider systems receiving the search signal may further transmit the search signal to each of their corresponding transmitting towers. The plurality of transmitting towers receiving the search signal are preferably programmed to capture the radio frequency signals emitted by the item, where the radio frequency signals contain the second item identifier. At step 410, a transmitting tower in the plurality of transmitting towers, captures the radio frequency signals emitted by an identification tag installed on the item, when the item is situated within a location range of the transmitting tower. At step 412, the transmitting tower transmits a location message comprising the location information of the item to the mobile service provider system. The location information of the item may include a derivative function of the geo spatial coordinates of the transmitting tower. On receiving the location message, the mobile service provider system retrieves the location information and the second item identifier from the location message, at step 414.

Further at step 416, the location information and the second item identifier of the item are transmitted from the mobile service provider system to the tracking service server. On receiving the location information and the second item identifier of the item, at step 418, the tracking service server maps the second item identifier to a contact information of the user, stored in the tracking service database. An instance of a contact information of the user can be a mobile number of the user. At step 420, the tracking service server transmits a response message comprising the location information of the item to the retrieved contact information of the user 108 viz. the mobile number in the instance. In the disclosed embodiment where the item is an electronic or an electromechanical device, at step 422, the user can transmit a lock request for deactivating the item. In the disclosed embodiment, where the item is the electromechanical device the lock request can comprise a request to immobilize the item. Further, at step 424, the tracking service server is programmed to transmit a lock signal to the mobile service provider system for deactivating the item in case the item is an electronic item. Alternatively, at step 402, the tracking service server can be programmed to transmit an immobilizing signal to the item, when the item is the electromechanical device.

In the disclosed embodiment, where the search signal is transmitted to the one or more mobile service provider systems, the lock signal is transmitted to that mobile service provider system that communicated the location information of the item to the tracking service server. At step 426, the mobile service provider system transmits the lock signal, and alternatively the immobilizing signal, to the transmitting tower that captured the location of the item. At step 428, the transmitting tower transmits a deactivation signal to the item for deactivating the item. The item can be deactivated at step 430, on receiving the deactivation signal. In the disclosed embodiment, where the item is an electromechanical device such as an automobile, the transmitting tower can be programmed to transmit an immobilizing signal that is configured to lock the engine of the automobile for immobilization. A feature of deactivation of the item can help protect the item from being towed away.

While the foregoing has described certain embodiments and the best mode of practicing the invention, it is understood that various implementations, modifications and examples of the subject matter disclosed herein may be made. It is intended by the following claims to cover the various implementations, modifications, and variations that may fall within the scope of the subject matter described.

What is claimed is:

1. A method for determining a location of an item, the method comprising:
   by a tracking service server:
      receiving, from a communication device of a user, a request to search for an item coupled to a radio frequency identification (RFID) tag, the RFID tag storing an electronic product code (EPC) of the item, wherein the request comprises an item identifier that identifies the item and is associated with the EPC of the item;
   retrieving the EPC of the item from a tracking service data store using the item identifier;
   transmitting a search signal comprising the EPC of the item to at least one mobile service provider system in communication with a plurality of transmitting towers, wherein the search signal instructs the plurality of transmitting towers to capture radio frequency (RF) signals emitted by the RFID tag coupled to the item, wherein the RF signals emitted by the RFID tag include the EPC of the item; and
   receiving a location message indicating location information of the item, the location information based on a detection, by at least one of the plurality of transmitting towers, of RF signals emitted by the RFID tag and captured by the at least one of the plurality of transmitting towers.

2. The method of claim 1, wherein the detection indicates that the item is within a location range of the at least one of the plurality of transmitting towers.

3. The method of claim 1, wherein the location information of the item is a function of a set of location coordinates of the at least one of the plurality of transmitting towers that performed the detection.

4. The method of claim 1, further comprising:
   communicating a response message to the communication device of the user, the response message comprising the location information of the item.

5. The method of claim 4, wherein the tracking service data store comprises:
   entries for a plurality of items registered with the tracking service server, and
   for the respective items of the plurality of items:
   user contact information associated with the item, and
   an item identifier and an EPC of the item.

6. The method of claim 5, further comprising:
   prior to communicating the response message, retrieving user contact information of the user, the user contact information being stored in association with the EPC in the tracking service data store.

7. The method of claim 1, further comprising:
   receiving a lock request for deactivating the item, wherein the item is at least one of an electronic device or an electromechanical device;
   upon receiving the lock request, transmitting a lock signal to the at least one mobile service provider, the lock signal prompting the at least one of the plurality of transmitting towers to transmit a deactivation signal to the RFID tag.

8. The method of claim 1, wherein the identification RFID tag comprises an active RFID chip.

9. A system for determining a location of an item, the system comprising:
   at least one mobile service provider system;
   a tracking service server configured to:
      receive, from a communication device associated with a user, a request to search for an item having a radio frequency identification (RFID) tag, the RFID tag storing an electronic product code (EPC) of the item;
      retrieve the EPC of the item from a tracking service data store, wherein the EPC is stored in association with a first item identifier in the tracking service data store; and
      transmit a search signal comprising the EPC of the item to the at least one mobile service provider system; and
   a plurality of transmitting towers communicatively coupled with the at least one mobile service provider system, the plurality of transmitting towers configured to:
      receive the search signal from the at least one mobile service provider system when the at least one mobile service provider system transmits the search signal to the plurality of transmitting towers;
      capture radio frequency signals emitted by the RFID tag of the item in response to receiving the search signal from the at least one mobile service provider system, wherein the radio frequency signals emitted by the RFID tag include the EPC of the item; and
      transmit a location message to the at least one mobile service provider system on capturing the radio frequency signals emitted by the RFID tag, the location message comprising location information of the item.

10. The system of claim 9, wherein the location information of the item is a function of a set of location coordinates of a transmitting tower in the plurality of transmitting towers that captures the radio frequency signals emitted by the RFID tag of the item.

11. The system of claim 9, wherein the tracking service data store is configured to store: entries for a plurality of items, contact information for users associated with the plurality of items, a plurality of first item identifiers, and a plurality of EPCs for the plurality of items, the plurality of items being registered with the tracking service server.

12. The system of claim 9, wherein at least one mobile service provider system is configured to:
   receive the location message from one or more of the plurality of transmitting towers;
   retrieve the location information and the EPC of the item from the location message; and
   transmit the location information and the EPC of the item to the tracking service server.

13. The system of claim 12, wherein the tracking service server is further configured to:
   receive the location information and the EPC of the item from the at least one mobile service provider; and
   communicate a response message to the communication device associated with the user, the response message comprising the location information of the item.

14. The system of claim 13, wherein the tracking service server is further configured to retrieve contact information associated with the user from the contact information stored in the tracking service data store for communicating the response message, the contact information being stored in association with the first item identifier associated with the EPC retrieved from the tracking service data store.

15. The system of claim 13, wherein the tracking service server is further configured to:
   receive a lock request for deactivating the item from the communication device associated with the user, wherein the item is at least one of an electronic device or an electromechanical device; and
   transmit a lock signal to the at least one mobile service provider system.

16. The system of claim 15, wherein the at least one mobile service provider system is further configured to transmit the lock signal to one or more of the plurality of transmitting towers.

17. The system of claim 16, wherein the one or more of the plurality of transmitting towers is configured to transmit a deactivation signal to the item on receiving the lock signal from the at least one mobile service provider system, and wherein the deactivation signal is configured to deactivate the item.

18. The system of claim 9, wherein the communication device comprises a communication interface configured to communicate with the tracking service server.

19. The system of claim 18, wherein the communication interface comprises at least one of:
   a short message service (SMS) application executing on the communication device that communicates with the tracking service server through a mobile communication network;
   a web browser that communicates with a web application hosted on the tracking service server, wherein the tracking service server is a web server; or
   a public switched telephone network (PSTN) telephone that communicates with a call center, wherein the call center communicates with a web browser of the tracking service server.

20. The system of claim 18, wherein the communication interface comprises a PSTN telephone that communicates with the tracking service server through an Interactive Voice Recognition (IVR) system.

21. The system according to claim 18, wherein the communication interface comprises a wireless application protocol (WAP) micro-browser executing on the communication device that communicates with a mobile communications network which in turn communicates with a WAP gateway, and wherein the WAP gateway communicates with the tracking service server.

22. The system of claim 9, wherein the RFID tag comprises an active RFID chip.

23. One or more non-transitory computer-readable storage media storing instructions that, when executed by a computing device, perform a method for determining a location of an item, the method comprising:
   receiving a search request, comprising an item identifier, for an item associated with an active radio frequency identification (RFID) tag, the active RFID tag storing an electronic product code (EPC) of the item;
   retrieving the EPC of the item from a tracking service data store using the item identifier,
   transmitting, by a short message service (SMS) message, a search signal comprising the EPC of the item to at least one mobile service provider system in communication with a plurality of transmission towers, the search signal instructing the mobile service provider system to determine whether radio frequency (RF) signals transmitted by the active RFID tag are received by any of the plurality of transmitting towers, wherein the RF signals transmitted by the active RFID tag include the EPC of the item; and receiving a location message indicating location information of the item, the location information based on a detection, by at least one of the plurality of transmitting towers, of RF signals transmitted by the active RFID tag, wherein the detection indicates that the item is located within a service area of the at least one of the plurality of transmission towers.

24. The one or more non-transitory computer-readable storage media of claim 23, wherein the method further comprises:

receiving a lock request for deactivating the item, wherein the item is an electronic device; and upon receiving the lock request, transmitting a lock signal to the at least one mobile service provider, the lock signal prompting the at least one of the plurality of transmitting towers to transmit a deactivation signal to the RFID tag.

* * * * *